United States Patent [19]
Vann

[11] 3,835,317
[45] Sept. 10, 1974

[54] MARKER FOR CEMENTED CASING

[76] Inventor: Roy R. Vann, Box 40-A Star Route West, Artisia, N. Mex. 88210

[22] Filed: Dec. 22, 1972

[21] Appl. No.: 317,648

Related U.S. Application Data

[63] Continuation-in-part of Ser. No. 109,381, Jan. 25, 1971, Pat. No. 3,710,114.

[52] U.S. Cl. .............................. 250/260, 250/303
[51] Int. Cl. ............................................ G21h 5/02
[58] Field of Search ....... 250/83.6 W, 106 S, 106 T, 250/106 L, 259, 260, 303

[56] References Cited
UNITED STATES PATENTS 2,220,205  11/1940  Buckley ...................... 250/106 T X
2,588,210  3/1952  Crisman et al. ............. 250/106 L X
3,426,204  2/1969  Sutton ......................... 250/106 T X Primary Examiner—Archie R. Borchelt
Attorney, Agent, or Firm—Marcus L. Bates

[57]  ABSTRACT

Method of determining the location in a well bore of the top of a cement plug by adding an isotope having a known half-life to the cement slurry as the cement is initially pumped into the borehole annulus. The isotope is subsequently located by measuring the radio activity of the borehole with radiation measuring apparatus of the prior art.

6 Claims, 10 Drawing Figures

PATENTED SEP 10 1974 3,835,317

MARKER FOR CEMENTED CASING

REFERENCE TO RELATED APPLICATIONS

This patent application is a continuation-in-part of patent application Ser. No. 109,381 filed Jan. 25, 1971, for "Method and Apparatus for Determining Communication of a Perforated Zone with a Second Zone," now U.S. Pat. No. 3,710,114 issued Jan. 9, 1973.

BACKGROUND OF THE INVENTION

Casings are cemented into place by pumping a calculated amount of cement slurry into a predetermined location or position in the annular space between the casing and the borehole wall. This expedient provides an impermeable seal between the formation and the casing when the cementing operation is properly carried out.

Usually, the cement, as it is pumped into the casing, displaces another fluid such as drilling mud or water from the annulus. Often a proper quantity of displaced fluid fails to return to the mud pit, thereby indicating that improper placement of the cement has occurred.

Where excessive pressure is employed in order to place a long column of cement in the borehole annulus, fluid loss to incomplete formations can occur, thereby resulting in the improper placement of the cement.

Accordingly, the top of the cement plug is seldom located at the precise calculated position in the borehole because of the above and other ramifications peculiar to cementing casings and other tubular goods into a fixed position within a borehole.

SUMMARY OF THE INVENTION

The present invention comprehends a method of marking the precise location of the top of a cement plug in the annulus of a borehole.

On cementing a casing into fixed position within a borehole, an isotope having a known half-life is added to the cement slurry as the cement is initially pumped into the borehole annulus.

The isotope is of a weight to cause it to remain at the top of the cement plug. The isotope can be encapsulated within a plastic housing so as to protect it from its environment as well as to enable the specific weight of the pellet to be easily controlled.

After the cement plug has set, the borehole is logged by taking a gamma ray survey, thereby precisely determining the location of the radio active pellet, which coincides with the location of the upper extremity of the cement plug.

It is therefore a primary object of this invention to provide a method of determining the precise location of the top of a cement plug in a borehole.

Another object of this invention is the provision of method and apparatus for determining the top of a column of cement used to fix the casing of a well to the borehole wall.

Still another object of this invention is the provision of method and apparatus for locating the top of a cement plug which bonds well casing to a borehole wall.

A further object of this invention is the provision of method and apparatus for determining the height of a column of cement used to cement casing within a borehole annulus.

The above objects are attained by the provision of apparatus fabricated in accordance with the above abstract and summary, and by employment of the above described method.

These and various other objects and advantages of this invention will become readily apparent to those skilled in the art upon reading the following detailed description and by referring to the accompanying drawings and claims.

DETAILED DESCRIPTION OF THE PREFERRED EMBODIMENTS

Figure 1:
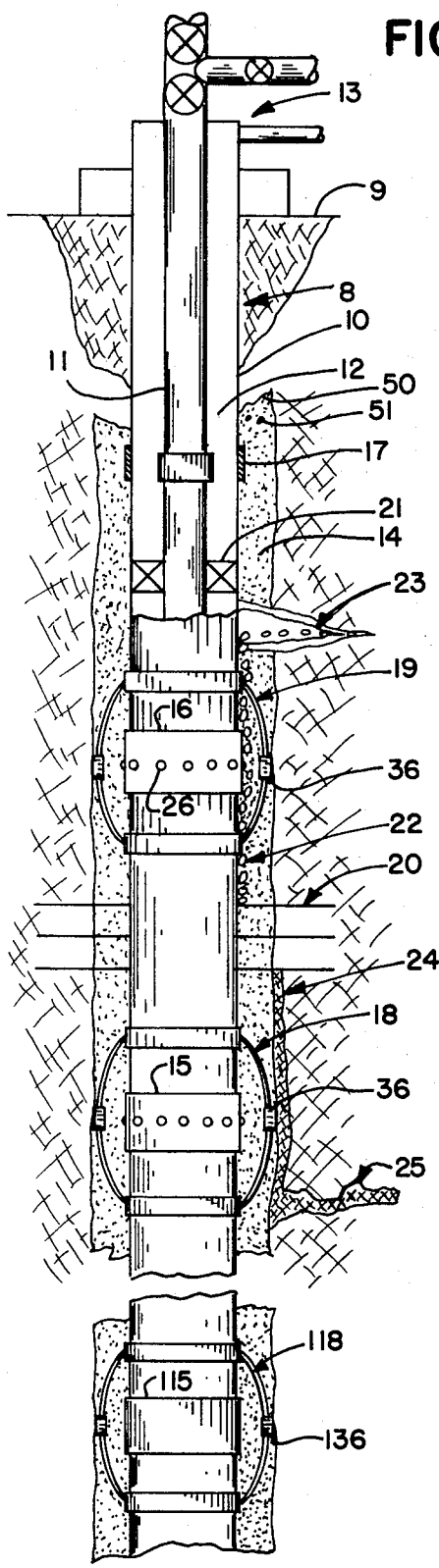
FIG. 1 is a diagrammatical representation of a cross-sectional view of a portion of the earth having a borehole formed therein, with apparatus fabricated in accordance with the present invention being disposed therein.
Figure 2:
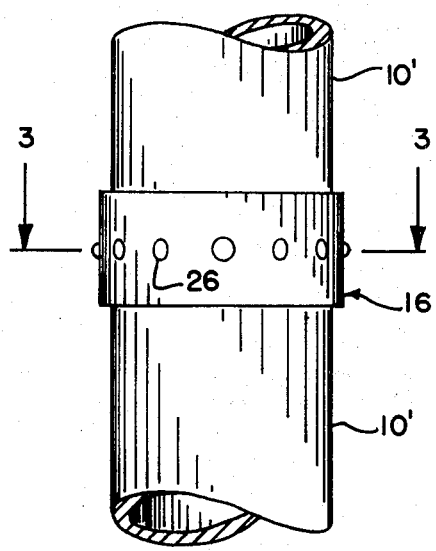
FIG. 2 is an enlarged fragmentary representation of part of the apparatus seen in FIG. 1.

FIG. 1 schematically discloses a borehole 8 which extends downwardly from the surface of the earth 9 and which has a casing 10 cemented therein for at least a portion of its length. Within the casing there is usually axially disposed a longitudinally extending production tubing 11 which cooperates with the casing to form a casing annulus 12.

The well head 13 can take on several different forms which usually includes the illustrated valve arrangement. Between the casing and the borehole wall is a substantial thickness of cement 14, which has been placed in the illustrated position by various methods known to those skilled in the art.

The ends of the individual joints of casing are joined together by various connection means which may include flush jointed casing, buttress threaded joints, extreme line casing joints, and the like, which form various coupling means. The coupling means, regardless of its form, is generally referred to herein as a "collar." A collar is seen at 15, 16, 17, and 115. The collars are therefore spaced apart from one another by at least one joint of casing.

Centralizer 18, which is of conventional design, is connected in proximity of collar 15, and centralizer 19 is connected in proximity of collar 16. Adjacent centralizers are spaced apart from one another and from a perforated production zone 20. Still another centralizer 118 is seen adjacent to collar 115.

The perforations in the casing, cement, and formation, which constitutes the perforated zone 20, can be formed by several different methods but a jet perforating gun is usually employed to penetrate into the production formation.

A packer 21 is seen affixed to the tubing string and to the inside wall of the casing but is not necessary for a comprehension of this invention.

As schematically illustrated by the arrow at numeral 22, the perforated zone 20 is in communication with a passageway which has been inadvertently formed between the exterior surface of the casing and the interior surface of the cement. The passageway may be of several different unknown appearances. The passageway forms a flow path which is following a line of least resistance extending from the production zone up to another formation, as generally indicated by the arrow at numeral 23.

The arrow at numeral 24 indicates another flow passageway which has been formed between the borehole wall and the exterior surface of the cement, creating a flow path extending from the perforated zone downhole to another zone or formation 25.

Each of the before mentioned collars 15 and 16 are provided with a plurality of small concavities placed radially about the outer marginal surface area thereof. Each of the concavities are filled with a first radio active material 26, also called a radio isotope, and hereinafter referred to as an "isotope."

Figure 4:
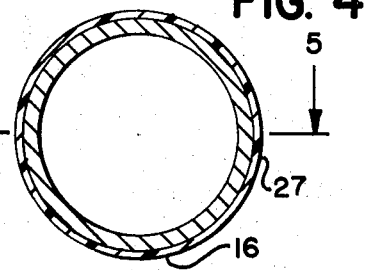
FIG. 4 sets forth a modification similar to that seen in FIG. 3A.
Figure 5:
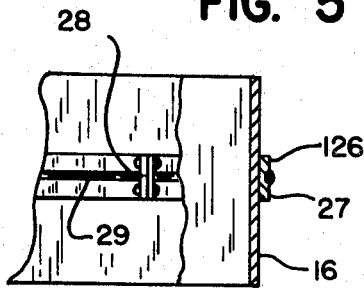
FIG. 5 is an enlarged fragmentary cross-sectional representation taken along line 5—5 of FIG. 4.
Figure 7:
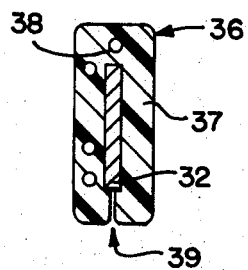
FIG. 7 is a cross-sectional view taken along line 7—7 of FIG. 6.

As seen in the illustration of FIGS. 4 and 5, the first isotope can alternatively be placed within a circumferentially extending groove of a circumferentially extending plastic band 27. Another alternative is actually painting an isotope containing material thereon. As seen in FIG. 5, the plastic band 27 can be attached to the exterior wall surface of the casing by a fastener means such as seen at 28, if desired. Numeral 29 indicates a circumferentially extending groove placed within the band 27 for holding an isotope therein so as to dispose the isotope at the interface formed between the cement and the outer peripheral wall surface of the casing.

Figure 6:
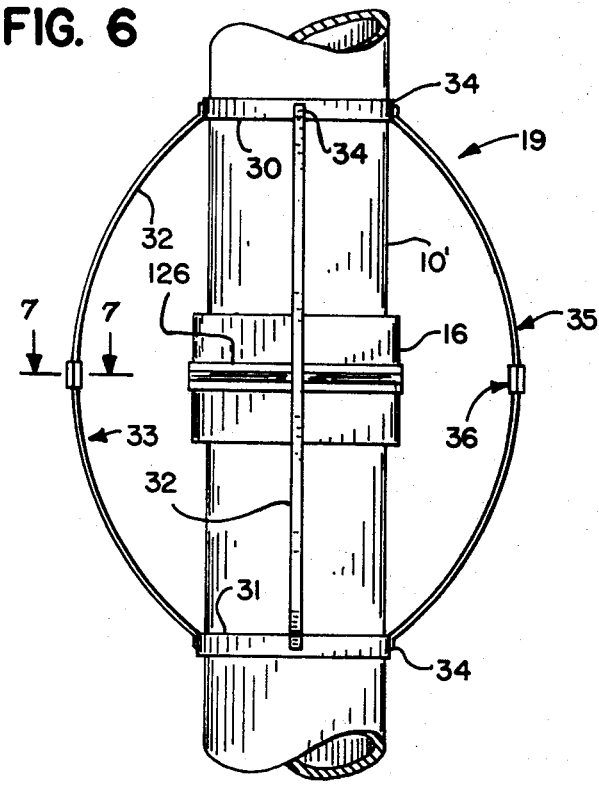
FIG. 6 is a fragmentary enlarged representation of part of the apparatus disclosed in FIG. 1.

FIG. 6 discloses the details of the centralizers seen at 18, 118, and 19. The centralizer is of the usual construction and includes spaced apart, slidably received, circumferentially extending bands 30 and 31 which support a plurality of radially spaced apart bows 32. Bands 30 and 31 are slidably captured by the enlargement presented by the fastener means exemplified by the collar 16.

The bands are bowed in the usual manner as indicated by the arrow at numeral 33. The second isotope 36 is affixed to a mid-portion of each of the bands at a position where the band contacts the borehole wall. The second isotope is held within the illustrated U-shaped body 37. The body has an enlarged central portion defined by the spaced apart legs which encircle a marginal length of the bow. The entrance into the U-shaped portion of the body is indicated by the arrow at numeral 39. The legs may be sprung apart the required amount to enable them to be placed about the bow, where their natural resiliency will anchor them in place.

A plurality of longitudinally aligned drilled passageways 38 contain the isotope. It will be noted that the side of the body which scrapes the wall of the borehole as the casing is being run into the hole is devoid of an isotope because this portion of the body could be abraded away, thereby depositing the isotope along the wall surface of the borehole, and accordingly, producing a false reading when the hole is logged at a subsequent date.

Figure 8:
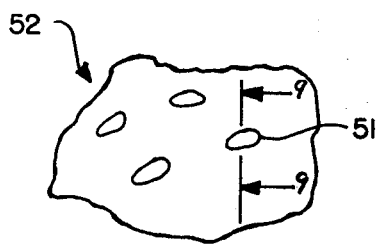
FIG. 8 is an enlarged fragmentary representation of part of the cement mass seen in FIG. 1.

Looking again now to FIG. 1, numeral 50 arbitrarily indicates the interface formed between the top of the cement plug and other mud-like material which may fill the upper borehole annulus. Immediately below the interface there is seen a pellet 51, and as disclosed in FIG. 8, the pellet is embedded within a mass of cement 52. The pellet is of a density which is slightly less than cement but substantially greater than water, and accordingly, the pellet preferably follows or comes to rest in close proximity to the illustrated interface.

Figure 9:
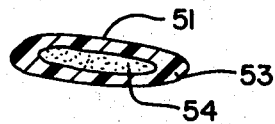
FIG. 9 is a cross-sectional view taken along line 9—9 of FIG. 8.

As seen in FIG. 9, the pellet is comprised of a plastic housing 53 which encapsulates a third isotope 54. The third isotope preferably is one that has a long half-life so that the top of the cement plug can be independently determined at any subsequent date merely by running a radiation measuring or counting device into the borehole.

OPERATION

Figure 3A:
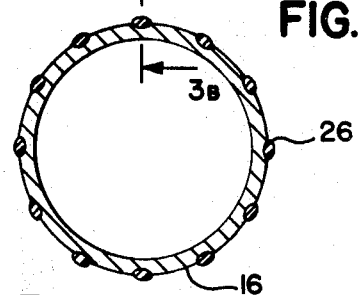
FIG. 3A is a cross-sectional view taken along line 3—3 of FIG. 2.
Figure 3B:
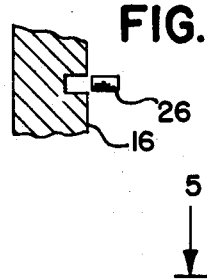
FIG. 3B is a cross-sectional view taken along line 3B—3B of FIG. 3A.

In operation, after the borehole has been formed, as the casing is assembled and run into the hole, the first isotope is placed at spaced apart elevations downhole and uphole of the area to be perforated. The isotope can be placed adjacent to the casing and circumferentially positioned thereabout at an infinite number of positions as seen illustrated in FIGS. 5 and 6, or at radially spaced apart positions as indicated in FIGS. 3 and 4.

Either before or after the centralizers have been placed about the casing, the bodies containing the isotopes are attached to the individual bows. The side of the body containing the isotope is preferably arranged inwardly disposed with respect to the borehole wall, so as to present an isotope free wearing surface to the wall. The side of the body which is abraded away by the inside peripheral wall surface of the borehole can be provided with a layer of steel, if desired, or the entire body can be made of metal, if desired.

It is not essential that the first isotope 26 be located immediately adjacent the second isotope 36. There are advantages to the isotopes being arranged in a spaced apart manner, such as seen illustrated at 136 in FIG. 1. It is essential, however, that the first isotope be located adjacent to the casing and spaced apart uphole and downhole from the zone to be perforated.

It is also essential that the second isotope be located adjacent to the borehole wall at spaced apart locations uphole and downhole of the zone to be perforated. After the casing has been cemented into place, a gamma ray survey should be made to assure that no cavity or tunneling or fracturing of the cement has inadvertently occurred, and also to assure that the four isotopes are properly located in the desired location within the borehole, as well as obtaining a log which shows the normal disposition of the isotopes.

After the borehole is perforated, if production so warrants, the well may be placed on stream or into production with no subsequent treatment. However, should production be unsatisfactory, the borehole is again logged by running another gamma ray survey, the results of which should be identical to the first survey if the cement has been properly affixed to the casing and to the borehole wall. If the log indicates that the cement has not been tunneled through or around, it is customary to attempt increased production by acidizing the well, followed by a fracturing treatment.

After acidizing the well, and before the expensive fracturing treatment, the well should again be logged to make sure that the acid was pumped through the perforations and into the formation, and that the acidizing operation did not produce undesirable communication between the perforated zone and another formation. Should it be found that the acidizing treatment did indeed form passageways through or around the cement, then the acid failed to flow through the perforations and into the production zone, and accordingly, the faulty cementing operation must be repaired and the well again completed in the above described manner. Obviously, the analysis has avoided an expensive and redundant fracturing operation.

On the other hand, should the log indicate that the acidizing operation was successful, then the well is next fractured and again subjected to a gamma ray survey to make certain that the fracturing treatment was effected at the perforated zone and not inadvertently at another formation 23 or 25, for example. If the completion of the well was satisfactorily carried out as evidenced by the isotopes remaining in their original positions, and if the well log shows that a good production zone exists, then the well must produce hydrocarbons.

Should any of the above gamma ray surveys indicate that one of the isotopes have been translocated from their original position, then obviously one of the following determinable conditions has been brought about:

1. The first uphole isotope 26 has been translocated uphole to another formation 23.
2. The first downhole isotope at 15 has been translocated downhole in a manner similar to (1).
3. The second downhole isotope 36 has been translocated downhole to another formation 25.
4. The second uphole isotope 36 has been translocated uphole to another formation in a manner similar to (3).

Accordingly, when fluid flows either to or from the production zone along the interface between the cement and casing or the cement and the borehole wall, the longitudinal length and direction of the passageway respective of the borehole can be determined by a gamma ray survey which will indicate a lack of radioactivity adjacent the original location of the isotopes and an abrupt change in the radioactivity at the location to which the isotope was washed. The area to be recemented can be restricted to this location.

The isotope can be admixed or incorporated in a vehicle which is selectively soluble in any one of the following: hydrocarbons, water, or acid. It may sometime be advantageous to select a vehicle which is soluble in acid alone, or water alone, or a hydrocarbon alone, or a combination thereof. For example, a sugar, such as common candy can be used. As another example, a hard petroleum wax can be used to encase the isotope. A still further example is a water insoluble or a water soluble salt.

Those skilled in the art will recognize many other suitable isotopes and vehicles which can be advantageously employed in carrying out this invention, the above being examples only.

The sampling and analytical procedures used herein are safe, thoroughly developed, and reliable. The low radiation levels required of the instant isotopes are detectable with commercially available low level radio active counting devices which eliminates many of the hazards usually associated with the handling of radioactive materials.

After having read this disclosure, those skilled in the art of making and using isotopes will understand the desirability of using various different combinations of materials for the first and second isotopes, other than the materials suggested herein. As an example only, iridium 192 which has a half-life of 74 days is available in several different forms suitable for use as one of the isotopes. Iodine 131 which has a half-life of 8.1 days can be used as the second isotope. However, iodine 131 is destroyed by acid and must therefore be provided by a protective coating, such as encapsulating the material to provide a small pellet, so as to avoid its destruction.

Reference is made to the Tables of Nuclidic Data for further characteristics of radio isotopes having a half-life from a few seconds to many years, and from which there can be selected pairs of isotopes which are suitable for any desired downhole situation embraced by this invention.

I claim:
1. In a borehole having a casing cemented into fixed position by a cement plug, wherein the cement plug has been formed by pumping a cement slurry into the annulus formed between the casing and the borehole wall, the method of determining the location of the upper extremity of the cement plug comprising the steps of:
   1. adding an isotope having a known half-like to the cement as the cement slurry is initially pumped into the borehole annulus;
   2. encapsulating the isotope of step (1) within a body, adjusting the apparent specific weight of the combined body and isotope to a value which is less than the specific weight of the cement so as to cause the body to remain in the uppermost portion of the cement plug while the slurry hardens;
   3. measuring the radio activity of the borehole along the length thereof so as to determine the location of the isotope.

2. The method of claim 1, wherein the isotope is encapsulated within a plastic housing.

3. The method of claim 2, wherein the apparent specific weight of the encapsulated isotope is greater than water.

4. The method of claim 1, wherein the apparent specific weight of the encapsulated isotope is greater than water.

5. The method of claim 1, wherein drilling fluid is present in the borehole and the cement plug is formed by displacing the drilling fluid by pumping a cement slurry into the annulus, and further including the step of:
   4. adjusting the apparent specific weight of the combined body and isotope to a value which is greater than the specific weight of the drilling fluid.

6. The method of claim 5, wherein the isotope is encapsulated within a plastic housing.

* * * * *